United States Patent [19]

Vanmaele et al.

[11] Patent Number: 5,665,677

[45] Date of Patent: *Sep. 9, 1997

[54] N-ALKYL-N-PARA-AMINOARYL SUBSTITUTED DICYANOVINYL ANILINE DYES FOR USE IN THERMAL TRANSFER PRINTING

[75] Inventors: Luc Vanmaele, Lochristi; Wilhelmus Janssens, Aarschor, both of Belgium

[73] Assignee: Agfa-Gevaert N.V., Mortsel, Belgium

[ * ] Notice: The term of this patent shall not extend beyond the expiration date of Pat. No. 5,397,762.

[21] Appl. No.: 590,832

[22] Filed: Jan. 24, 1996

Related U.S. Application Data

[63] Continuation-in-part of Ser. No. 426,984, Apr. 21, 1995, Pat. No. 5,514,638.

[30] Foreign Application Priority Data

May 25, 1994 [EP] European Pat. Off. ............. 94201480

[51] Int. Cl.$^6$ ............................. B41M 5/035; B41M 5/38

[52] U.S. Cl. ..................... 503/227; 428/195; 428/913; 428/914

[58] Field of Search ........................ 8/471; 428/195, 428/913, 914; 503/227

[56] References Cited

U.S. PATENT DOCUMENTS

| | | | |
|---|---|---|---|
| 5,397,762 | 3/1995 | Vanmaele et al. | 503/227 |
| 5,514,638 | 5/1996 | Vanmaele et al. | 503/227 |

*Primary Examiner*—Bruce H. Hess
*Attorney, Agent, or Firm*—Brumbaugh, Graves, Donohue & Raymond

[57] ABSTRACT

The present invention provides a dye donor element for use according to thermal dye transfer methods comprising a support having thereon a dye layer comprising a binder and a yellow dye of the class of N-alkyl-N-para-aminoaryl-substituted dicyanovinylaniline dyes. Images obtained with such a donor element in a thermal dye diffusion transfer process are less susceptible to catalytic fading and have thus an improved light fastness.

6 Claims, No Drawings

N-ALKYL-N-PARA-AMINOARYL SUBSTITUTED DICYANOVINYL ANILINE DYES FOR USE IN THERMAL TRANSFER PRINTING

This is a continuation-in-part of U.S. Ser. No. 08/426,984 filed Apr. 21, 1995, now U.S. Pat. No. 5,514,638.

DESCRIPTION

1. Field of the Invention

The present invention relates to yellow N-para-dialkylaminoaryl-N-alkyl-substituted dicyanovinylaniline dyes and to dye-donor elements comprising such dyes for use according to thermal dye transfer methods, in particular for reducing the catalytic fading of the black, green and red shades of images.

2. Background of the Invention

Thermal dye transfer methods include thermal dye sublimation transfer also called thermal dye diffusion transfer. This is a recording method in which a dye-donor element provided with a dye layer containing sublimating dyes having heat transferability is brought into contact with a receiver sheet and selectively, in accordance with a pattern information signal, heated with a thermal printing head provided with a plurality of juxtaposed heat-generating resistors, whereby dye is transferred from the selectively heated regions of the dye-donor element to the receiver sheet and forms a pattern thereon, the shape and density of which are in accordance with the pattern and intensity of heat applied to the dye-donor element.

A dye-donor element for use according to thermal dye sublimation transfer usually comprises a very thin support e.g. a polyester support, one side of which is covered with a dye layer comprising the printing dyes. Usually, an adhesive or subbing layer is provided between the support and the dye layer. Normally, the opposite side of the support is covered with a slipping layer that provides a lubricated surface against which the thermal printing head can pass without suffering abrasion. An adhesive layer may be provided between the support and the slipping layer.

The dye layer can be a monochromic dye layer or it may comprise sequential repeating areas of differently coloured dyes e.g. dyes having a cyan, magenta, yellow, and optionally black hue. When a dye-donor element containing three or more primary colour dyes is used, a multicolour image can be obtained by sequentially performing the dye transfer process steps for each colour.

Many of the dyes proposed for use in thermal dye sublimation transfer are not sufficient in performance since they yield inadequate transfer densities at reasonable coating coverages, or because they have inadequate spectral characteristics for substractive colour systems, or because they have a poor light-fastness.

Yellow dyes that satisfy the absorption requirements can be found in the class of the so-called dicyanovinylaniline dyes. Such yellow dyes have been described for use in thermal transfer recording in U.S. Pat. No. 4,833,123, EP 271,861, JP 84/78,895 EP 92203566 and EP93203136.

Although many yellow dyes of this class have indeed excellent spectral absorption characteristics, they lack sufficient light-fastness.

The poor light-fastness of dicyanovinylaniline dyes used for thermal printing has been emphasized in Chemistry and industry, 16 Oct. 1989, p. 682, FIG. 7.

The use of known yellow dicyanovinylaniline dyes has further inconveniences as explained hereinafter. The so-called additive colours green, red, and blue in the prints are obtained by sequentially printing the primary colours on one another, e.g. for green: cyan and yellow; for blue: cyan and magenta; for red: magenta and yellow and for black: cyan, magenta and yellow, so that the resulting shades are in fact built up by mixtures of dyes.

Unfortunately, dye images that have been transferred from dye-donor elements and contain mixtures of dyes frequently show an increased fading rate owing to a photochemical effect known as catalytic fading of dye mixtures.

This phenomenon has been investigated in textile dyeing by Rembold and Kramer cfr. Journal of the Society of Dyers and Colourists, vol. 94 (1978), pages 12–17 and by Asquith and Ingham cfr. Journal of the Society of Dyers and Colourists, vol. 89 (1973), pages 81–85. It has been established indeed that the light-fastness of a single dye applied to textiles is often much better than that of mixed dyes. In most of the reported cases, the light-fastness of cyan, violet, or red dyes deteriorates when a yellow dye is added.

The N,N-disubstituted dicyanovinylaniline dyes of the prior art unfortunately show a high catalytic fading effect when mixed with other dyes to form red, green and black shades.

3. SUMMARY OF THE INVENTION

It is an object of the present invention to provide yellow dicyanovinylaniline dyes that combine good light fastness with good spectral absorption characteristics and are suitable for use in thermal dye sublimation transfer printing, in particular for making images having a reduced catalytic fading in the red, green and black shades.

Further objects will become apparent from the description hereinafter.

According to the present invention a dye-donor element for use according to thermal dye transfer methods is provided, said dye-donor element comprising a support having thereon a dye layer comprising a binder and a yellow dye of the class of N-alkyl-N-para-aminoaryl-substituted dicyanovinylaniline dyes optionally in combination with a magenta and/or a cyan dye.

According to a preferred embodiment of the present invention said yellow dye of the class of dicyanovinylaniline dyes corresponds to the general formula (I):

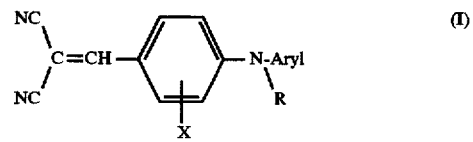

wherein:

X represents hydrogen or a substituent selected from the group consisting of an alkyl group, an alkenyl group, an aryl group, a halogen, an acylamino group, an aminocarbonyl group, an alkoxy group, an aryloxy group and an alkenyloxy group, Aryl represents an aryl group substituted in para with $NR^1R^2$, R represents an alkyl group, $R^1, R^2$ each independently represents hydrogen, an alkyl group, an aryl group or $R^1$ and $R^2$ together with the atoms to which they are attached represent the necessary atoms to complete a ring system.

Preferably, Aryl represents a phenyl group substituted in para with $NR^1R^2$.

According to the present invention there is further provided a method for making an image using a thermal imaging system consisting of a dye donor element as defined above and an image receiving element having on a support an image receiving layer, said method comprising the steps of:

bringing the dye layer of said donor element in face-to-face relationship with the receiving layer of said receiving element, image-wise heating a thus obtained assemblage and separating said donor element from said receiving element.

4. DETAILED DESCRIPTION OF THE INVENTION

The term "yellow" in connection with the present invention indicates dyes having an absorption maximum in the range of about 400 nm to about 500 nm when transferred to the receiving element.

The dyes corresponding to the above general formula (I) can be prepared according to established synthetic procedures known e.g. from EP93203136 and EP92203566.

A known method is the condensation of the appropriately substituted paraformylaniline with malonitrile.

Yellow N-alkyl-N-aminoaryl-substituted dicyanovinylaniline dyes for use in accordance with the present invention, that correspond to the above general formula (I), include the following listed in Table 1.

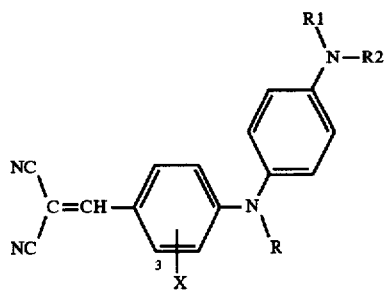

TABLE 1

| D no. | X | R | R¹ | R² |
|---|---|---|---|---|
| Y01 | H | CH(CH₃)C₂H₅ | C₂H₅ | C₂H₅ |
| Y02 | H | CH(CH₃)C₂H₅ | C₄H₉ | C₄H₉ |
| Y03 | H | CH(CH₃)C₂H₅ | C₄H₉ | CH(CH₃)C₂H₅ |
| Y04 | 3-CH₃ | CH(CH₃)C₂H₅ | C₄H₉ | CH(CH₃)C₂H₅ |
| Y05 | H | CH(CH₃)C₂H₅ | C₂H₅ | CH(CH₃)C₂H₅ |
| Y06 | H | CH(CH₃)C₂H₅ | CH₃ | CH₃ |
| Y07 | H | CH(CH₃)C₂H₅ | CH(CH₃)C₂H₅ | CH(CH₃)C₂H₅ |
| Y08 | H | C₄H₉ | C₄H₉ | CH(CH₃)C₂H₅ |

TABLE 1-continued

| D no. | X | R | R¹ | R² |
|---|---|---|---|---|
| Y09 | | | | (morpholino / HC(CH₃)(C₂H₅)) |
| Y10 | | | | (pyrrolidino / HC(CH₃)(C₂H₅)) |
| Y11 | | | | (piperidino / HC(CH₃)(CH₃)) |
| Y12 | | | | (N(C₄H₉)(HC(CH₃)C₂H₅), 3-CH₃, HC(CH₃)C₂H₅) |

The dye layer of the dye-donor element is formed preferably by adding the dyes, a polymeric binder medium, and other optional components to a suitable solvent or solvent mixture, dissolving or dispersing these ingredients to form a coating composition that is applied to a support, which may have been provided first with an adhesive or subbing layer, and dried.

The dye layer thus formed generally has a thickness of about 0.2 to 5.0 μm, preferably 0.4 to 2.0 μm, and the amount ratio of dye to binder generally ranges from 9:1 to 1:3 weight, preferably from 3:1 to 1:2 by weight.

The following polymer's can be used as polymeric binder: cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably, the binder for the dye layer of the present invention comprises cellulose acetate butyrate or copolystyrene-acrylonitrile.

The dye-donor element of the present invention can be used for the recording of a coloured image. Preferably such a dye-donor element comprises a dye layer having a repeating sequence of a yellow, magenta and cyan dye frame. In accordance with the present invention, the yellow dye frame comprises at least one yellow N-alkyl-N-para-aminoaryl substituted dicyanovinylaniline dye.

According to a particular preferred embodiment the magenta dye frame comprises at least one dye according to the following general formula (II):

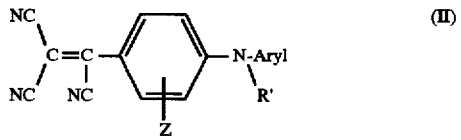

wherein

Z represents hydrogen or a substituent, selected from the group consisting of an alkyl group, an alkenyl group, an aryl group, a halogen, an acylamino group, an aminocarbonyl group, an alkoxy group, an aryloxy group and an alkenyloxy group, Aryl represents an aryl group, e.g. a phenyl or naphtyl group and R' represents an alkyl group.

The cyan dye frame preferably comprises at least one dye according to the following general formula (III):

wherein

Z' represents CN, COOR$^{19}$, or CONR$^{20}$R$^{21}$;

R$^{19}$, R$^{20}$, and R$^{21}$ each independently represent hydrogen, alkyl, aryl, or R$^{20}$ and R$^{21}$ together with the atoms to which they are attached represent the atoms needed to complete a heterocyclic ring;

Y' represents OR$^{22}$ or NR$^{23}$R$^{24}$, or CN or a phenyl group;

R$^{22}$ represents hydrogen, alkyl, aryl, SO$_2$R$^{25}$, COR$^{25}$, CSR$^{25}$, or POR$^{25}$R$^{26}$;

R$^{23}$ and R$^{24}$ each independently represents hydrogen, alkyl, aryl, an amino group, SO$_2$R$^{25}$, COR$^{25}$, CSR$^{25}$, or POR$^{25}$R$^{26}$, or R$^{23}$ and R$^{24}$ together with the atoms to which they are attached represent the atoms needed to complete a heterocyclic ring;

R$^{25}$ and R$^{26}$ each independently represent alkyl, alkenyl, aryl, alkoxy, aryloxy, alkylthio, arylthio, an amino group or a heterocyclic ring or R$^{25}$ and R$^{26}$ together with the atoms to which they are attached represent the atoms needed to complete a 5- or 6-membered ring;

X' represents N—Ar or N—Het;

Ar represents an aromatic ring substituted in para position by a substituent chosen from the group consisting of an amino group, alkoxy, aryloxy, alkylthio, arylthio, hydroxy, or mercapto and Het represents a heterocyclic ring.

The dyes according to the present invention can be mixed with one another or mixed with other primary colour dyes.

Typical and specific examples of other primary colour dyes for use in thermal dye sublimation transfer have been described in e.g. EP 400,706, EP 209,990, EP 216,483, EP 218,397, EP 227,095, EP 227,096, EP 229,374, EP 235,939, EP 247,737, EP 257,577; EP 257,580, EP 258,856, EP 279,330, EP 279,467, EP 285,665, U.S. Pat. Nos. 4,743,582, 4,753,922, 4,753,923, 4,757,046, 4,769,360, 4,771,035, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/268,493, JP 86/268, 494, JP 85/268,495, and JP 86/284,489.

For making black and white images it is advantageous to use a dye donor element having on a support a dye layer comprising a mixture of a yellow dye in accordance with the present invention, a magenta dye and/or a cyan dye.

The coating layer may also contain other additives, such as curing agents, preservatives, organic or inorganic fine particles, dispersing agents, antistatic agents, defoaming agents, viscosity-controlling agents, these and other ingredients having been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 µm. The support may also be coated with an adhesive of subbing layer, if desired.

The dye layer of the dye-donor element can be coated on the support or printed thereon by a printing technique such as a gravure process.

A dye-barrier layer comprising a hydrophilic polymer may also be employed between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227,091 and EP 228,065. Certain hydrophilic polymers e.g. those described in EP 227,091 also have an adequate adhesion to the support and the dye layer, so that the need for a separate adhesive or subbing layer is avoided. These particular hydrophilic polymers used in a single layer in the dye-donor element thus perform a dual function, hence are referred to as dye-barrier/subbing layers.

Preferably the reverse side of the dye-donor element has been coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$-$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids and fatty acid esters. Suitable slipping layers have been described in e.g. EP 138,483, EP 227,090, U.S. Pat. Nos. 4,567,113, 4,572,860, 4,717,711. Preferably the slipping layer comprises a styrene-acrylonitrile copolymer or a styrene-acrylonitrile-butadiene copolymer or a mixture thereof or a polycarbonate as described in EP 527520, as binder and a polysiloxane-polyether copolymer or polytetrafluoroethylene or a mixture thereof as lubricant in an amount of 0.1 to 10% by weight of the binder or binder mixture.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as a baryta-coated paper, polyethylene-coated paper or white polyester i.e. whitepigmented polyester. Blue-coloured polyethylene terephthalate film can also be used as support.

To avoid poor adsorption of the transferred dye to the support of the receiver sheet this support must be coated with a special layer called dye-image-receiving layer, into which the dye can diffuse more readily. The dye-imagereceiving layer may comprise e.g. a polycarbonate, a polyurethane, a polyester, a polyamide, polyvinyl chloride, polystyrene-co-acrylonitrile, polycaprolactone, or mixtures thereof. Preferably, the receiver sheet carries, a dye-imagereceiving layer comprising polyvinyl chloride. The dyeimage-receiving layer may also comprise a heat-cured product of poly(vinyl chloride/co-vinyl acetate/co-vinyl alcohol) and polyisocyanate. Suitable dye-image-receiving layers have been described in e.g. EP 133,011, EP 133,012, EP 144,247, EP 227,094, and EP 228,066.

In order to improve the light-fastness and other stabilities of recorded images UV-absorbers, singlet oxygen quenchers such as HALS-compounds (Hindered Amine Light Stabilizers) and/or antioxidants can be incorporated into the dye-image-receiving layer.

The dye layer of the dye-donor element or the dye-imagereceiving layer of the receiver sheet may also contain a releasing agent that aids in separating the dye-donor element from the receiver sheet after transfer. The releasing agents can also be incorporated in a separate layer on at least part of the dye layer and/or of the dye-image-receiving layer. Suitable releasing agents are solid waxes, fluorine- or phosphate-containing surface-active agents and silicone oils. Suitable releasing agents have been described in e.g. EP 133,012, JP 85/19,138, and EP 227,092.

The dye-donor elements according to the invention are used to form a dye transfer image, which process comprises placing the dye layer of the dye-donor element in face-toface relation with the dye-image-receiving layer of the receiver sheet and image-wise heating preferably from the back of the dye-donor element. The transfer of the dye is generally accomplished by heating for about several milliseconds at a temperature of 400° C.

When the process is performed for but one single colour, a monochromic dye transfer image is obtained. A multicolour image can be obtained by using a dye-donor element containing three or more primary colour dyes and sequentially performing the process steps described above for each colour. The above sandwich of dye-donor element and receiver sheet is formed on three occasions during the time when heat is applied by the thermal printing head. After the first dye has been transferred, the elements are peeled apart. A second dye-donor element (or another area of the dyedonor element with a different dye area) is then brought in register with the dye-receiving element and the process is repeated. The third colour and optionally further colours are obtained in the same manner.

In addition to thermal heads, laser light, infrared flash, or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat e.g. carbon black.

Alternatively, the support of the dye-donor element may be an electrically resistive ribbon consisting of e.g. a multilayer structure of a carbon-loaded polycarbonate coated with a thin aluminium film. Current is injected into the resistive ribbon by electrically addressing a printing head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology as compared to the thermal head technology, according to which the various elements of the thermal head get hot and must cool down before the head can move to the next printing position.

The following example illustrates the invention in more detail without, however, limiting the scope thereof.

EXAMPLE

Receiver sheets were prepared by coating a subbed polyethylene terephthalate film support having a thickness of 175 µm with a dye-image-receiving layer from a solution in ethyl methyl ketone of 3, 6 g/m$^2$ of poly(vinyl chloride/co-vinyl acetate/co-vinyl alcohol) Vinylite VAGD supplied by Union Carbide), 0.336 g/m$^2$ diisocyanate (Desmodur VL supplied by Bayer AG) or 0,435 g/sq.m of Desmodur N75 and 0,2 g/m$^2$ of hydroxy-modified polydimethylsiloxane (Tegomer H SI 2111 supplied by Goldschmidt).

Dye-donor elements for use according to thermal dye sublimation transfer were prepared as follows.

A solution comprising 0,5% by weight of dye and 0,5 % by weight of of poly(styrene-co-acrylonitrile) (Luran 388S, supplied by BASF Germany) as binder in methyl ethyl ketone was prepared.

From this solution a dye layer having a wet thickness of 100 µm was coated on a polyethylene terephthalate film support having a thickness of 6 µm and carrying a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid, and glycerol.

The resulting subbing layer was covered with a a solution in methyl ethyl ketone of 0.5 g/m² of a polycarbonate having the following structural formula to form a heat-resistant layer:

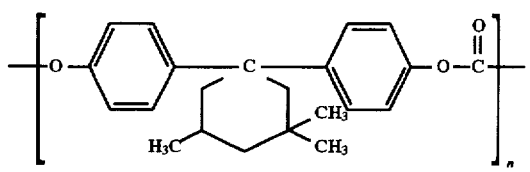

value giving a polycarbonate with a relative viscosity of 1.295 (measured in a 0.5% by weight solution in dichloromethane).

Finally, a top layer of polyether-modified polydimethylsiloxane; (Tegoglide 410, Goldschmidt) was coated from a solution in isopropanol on the resulting heat-resistant polycarbonate layer.

The dye-donor element was printed in combination with a receiver sheet in a Mitsubishi colour video printer CP100E.

The additive colour red was obtained by printing magenta dye in combination with yellow dye on one another, whereas the additive colour green was obtained by printing yellow dye in combination with cyan dye also on one another. Black mixtures of dyes are also used, as indicated further.

The receiver sheet was separated from the dye-donor element and the colour density value of the recorded image was measured by means of a Macbeth TR 924 densitometer in the red, green, blue and visual region in Status A mode.

The above described experiment was repeated for each of the dye mixtures identified in the Tables 5 and 6 hereinafter.

Finally, each receiver sheet was subjected to irradiation by means of a xenon lamp of 150 klux for a time indicated in hours. The colour density values were measured again and the density loss or gain (in %) was calculated and listed in the Tables 5 and 6.

In Table 2 the structure of known yellow N,N-dialkyl-substituted tricyanovinylaniline dyes used as comparison in the examples is given. These Comparison dyes correspond to the following formula (VI):

TABLE 2

| Comparison dye N° | R⁷ | R⁸ |
|---|---|---|
| CY01 | C₂H₅ | cyclohexyl-phenyl-OC₂H₄— |
| CY02 | C₄H₉ | H₃COC₂H₄O-phenyl- |

In Table 3 the dyes that are combined with yellow dicyanovinylaniline dyes for obtaining the dye mixtures are listed.

TABLE 3

D01, D02, D03 (structures shown)

TABLE 3-continued

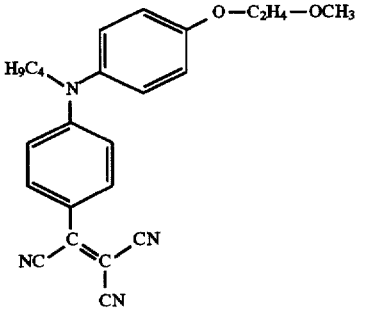

TABLE 5

| Combined dyes | Color formed | Density loss in % after Xenon radiation through filter | | | Filter |
|---|---|---|---|---|---|
| | | for 4 h | for 12 h | for 28 h | |
| CY01/CY02 + D04/D08 | Red | −4 | −17 | −83 | Green |
| *CY01/CY02 + D04/08 | Red | −4 | −16 | −54 | Green |
| Y01 + D04/08 | Red | −8 | −10 | −44 | Green |
| *Y02 + D04/D08 | Red | −2 | −5 | −22 | Green |
| Y01/CY01 + D04/D08 | Red | −2 | −10 | −48 | Green |
| *Y02/CY01 + D04/D08 | Red | −2 | −5 | −33 | Green |
| Y01/CY02 + D04/D08 | Red | −2 | −7 | −64 | Green |
| *Y03 + D04/D08 | Red | −3 | −9 | −30 | Green |
| *Y03 + CY02 + D04/D08 | Red | −1 | −7 | −26 | Green |
| *Y02/Y03 + D04/D08 | Red | −3 | −5 | −30 | Green |
| CY01/CY02 + D01/D02 | Green | −10 | −46 | −100 | Red |
| *CY01/CY02 + D01/D02 | Green | −11 | −54 | −98 | Red |
| Y01 + D01/D02 | Green | −7 | −10 | −57 | Red |
| *Y02 + D01/D02 | Green | −4 | −16 | −56 | Red |
| Y01/CY01 + D01/D02 | Green | −7 | −20 | −88 | Red |
| *Y02/CY01 + D01/D02 | Green | −7 | −21 | −95 | Red |
| Y01/CY02 + D01/D02 | Green | −7 | −21 | −94 | Red |
| *Y03 + D01/D02 | Green | −4 | −17 | −44 | Red |
| *Y03/CY02 + D01/D02 | Green | −5 | −20 | −68 | Red |
| *Y02/Y03 + D01/D02 | Green | −5 | −16 | −54 | Red |
| CY01/CY02 + D04/D08 + D01/D02 | Black | −3 | −15 | −64 | Visual |
| *CY01/CY02 + D04/D08 + D01/D02 | Black | −4 | −25 | −63 | Visual |
| Y01 + D04/D08 + D01/D02 | Black | 0 | −6 | −29 | Visual |
| *Y02 + D04/D08 + D01/D02 | Black | −2 | −11 | −36 | Visual |
| Y01/CY01 + D04/D08 + D01/D02 | Black | −3 | −8 | −31 | Visual |
| *Y02/CY01 + D04/D08 + D01/D02 | Black | −6 | −11 | −46 | Visual |
| *Y03 + D04/D08 + D01/D02 | Black | −2 | −8 | −27 | Visual |
| *Y03/CY02 + D04/D08 + D01/D02 | Black | −3 | −10 | −28 | Visual |
| *Y02/Y03 + D04/D08 + D01/D02 | Black | −4 | −11 | −29 | Visual |
| Y01/CY02 + D04/D08 + D01/D02 | Black | −2 | −9 | −46 | Visual |

Table 5 gives the values of catalytic fading effect measured for the different combinations.

*0: values obtained on receiving layer hardened with DESMODUR N75.

From Table 5 it is clear that addition of yellow dyes Y01, Y02 according to the invention results in color mixtures with substantially reduced catalytic fading effects.

Table 6 gives the values of catalytic fading effect when compounding different color dyes to black mixtures.

TABLE 6

| Compounded dyes | Relative ratio used | Density loss in % after Xenon irradiation for | | | through filter |
|---|---|---|---|---|---|
| | | 4 h | 12 h | 28 h | |
| *comparison* | | | | | |
| D03 | 28 | −6 | −19 | −39 | red |
| D05 | 13 | −2 | −7 | −24 | green |
| D06 | 31 | −2 | −4 | −12 | blue |
| D07 | 13 | −6 | −13 | −30 | visual |
| CY01 | 25 | | | | |
| *invention* | | | | | |
| D03 | 28 | −4 | −12 | −27 | red |
| D05 | 13 | 0 | −5 | −16 | green |
| D06 | 31 | 0 | −1 | −14 | blue |
| D07 | 13 | −3 | −8 | −20 | visual |
| Y01 | 25 | | | | |

From Table 6 it is clear that in a compounded black mixture by using a yellow dye of the invention instead of a yellow dye according to the prior art, the light stability of the mixture is improved due to reduced catalytic fading.

We claim:

1. A dye donor element for use according to thermal dye transfer methods comprising a support having thereon a dye layer comprising a binder and a yellow dye of the class of N-alkyl-N-para-aminoaryl-substituted dicyanovinylaniline dyes corresponding to the following general formula (I):

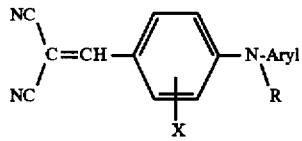

wherein:

X represents a substituent selected from the group consisting of an alkenyl group, an aryl group, a halogen, an acylamino group, an aminocarbonyl group, an alkoxy group, an aryloxy group and an alkenyloxy group, Aryl represents an aryl group para substituted with $NR^1R^2$, R represents an alkyl group, $R^1$, $R^2$ each independently represents hydrogen, an alkyl group, an aryl group or $R^1$ and $R^2$ together with the atoms to which they are attached represent the necessary atoms to complete a ring system.

2. A dye donor element according to claim 1 wherein said dye layer further comprises a cyan dye and/or a magenta dye.

3. A dye donor element according to claim 2 wherein said dye layer comprises a repeating sequence of a yellow, magenta and cyan dye frame and wherein said yellow dye frame comprises said yellow dye, said magenta dye frame comprises a magenta dye and said cyan dye frame comprises a cyan dye.

4. A dye donor element according to claim 3 wherein said magenta dye frame comprises a magenta dye having the following general formula (II):

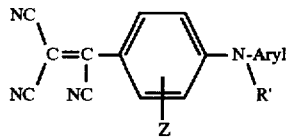

wherein

Z represents hydrogen or a substituent consisting of an alkyl group, an alkenyl group, an aryl group, a halogen, an acylamino group, an aminocarbonyl group, an alkoxy group, an aryloxy group and an alkenyloxy group, Aryl represents an aryl group and R' represents an alkyl group.

5. A dye donor element according to claim 3 wherein said cyan dye frame comprises a cyan dye having the following general formula (III):

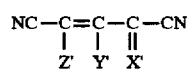

wherein

Z' represents CN, $COOR^{19}$, or $CONR^{20}R^{21}$;

$R^{19}$, $R^{20}$, and $R^{21}$ each independently represent hydrogen, alkyl, aryl, or $R^{20}$ and $R^{21}$ together with the atoms to which they are attached represent the atoms needed to complete a heterocyclic ring;

Y' represents $OR^{22}$ or $NR^{23}R^{24}$, or CN or a phenyl group;

$R^{22}$ represents hydrogen, alkyl, aryl, $SO_2R^{25}$, $COR^{25}$, $CSR^{25}$, or $POR^{25}R^{26}$;

$R^{23}$ and $R^{24}$ each independently represents hydrogen, alkyl, aryl, an amino group, $SO_2R^{25}$, $COR^{25}$, $CSR^{25}$, $POR^{25}R^{26}$, or $R^{23}$ and $R^{24}$ together with the atoms to which they are attached represent the atoms needed to complete a heterocyclic ring;

$R^{25}$ and $R^{26}$ each independently represent alkyl, alkenyl, aryl, alkoxy, aryloxy, alkylthio, arylthio, an amino group or a heterocyclic ring or R25 and $R^{26}$ together with the atoms to which they are attached represent the atoms needed to complete a 5- or 6-membered ring;

X' represents N—Ar or N—Het;

Ar represents an aromatic ring substituted in para position by a substituent chosen from the group consisting of an amino group, alkoxy, aryloxy, alkylthio, arylthio, hydroxy, or mercapto and Het represents a heterocyclic ring.

6. A method for making an image using a thermal imaging system consisting of a dye donor element as defined in any of claims 1 to 5 and an image receiving element having on a support an image receiving layer, said method comprising the steps of:

bringing the dye layer of said donor element in face-to-face relationship with the receiving layer of said receiving element, image-wise heating a thus obtained assemblage and separating said donor element from said receiving element, wherein said yellow dye corresponds to the following general formula (I):

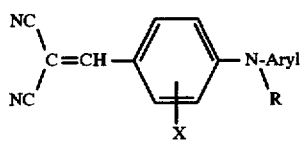

wherein:

X represents a substituent selected from the group consisting of an alkenyl group, an aryl group, a halogen, an acylamino group, an aminocarbonyl group, an alkoxy group, an aryloxy group and an alkenyloxy group, Aryl represents an aryl group para substituted with $NR^1R^2$, R represents an alkyl group, $R^1$, $R^2$ each independently represents hydrogen, an alkyl group, an aryl group or $R^1$ and $R^2$ together with the atoms to which they are attached represent the necessary atoms to complete a ring system.

* * * * *

UNITED STATES PATENT AND TRADEMARK OFFICE
CERTIFICATE OF CORRECTION

PATENT NO. : 5,665,677

DATED : September 9, 1997

INVENTOR(S) : Vanmaele et al.

It is certified that error appears in the above-identified patent and that said Letters Patent is hereby corrected as shown below:

Column 14, line 40, "$POR^{25}R^{26}$" should read --or $POR^{25}R^{26}$--.

Signed and Sealed this

Nineteenth Day of May, 1998

*Attest:*

*Attesting Officer*

BRUCE LEHMAN

*Commissioner of Patents and Trademarks*